Oct. 3, 1961 H. KNOHL Re. 25,046

ELASTIC GARMENT

Original Filed June 3, 1959 2 Sheets-Sheet 1

INVENTOR.
Herbert Knohl

ELASTIC GARMENT

Original Filed June 3, 1959 2 Sheets-Sheet 2

INVENTOR.
Herbert Knohl

United States Patent Office

Re. 25,046
Reissued Oct. 3, 1961

25,046
ELASTIC GARMENT

Herbert Knohl, Seneca, S.C., assignor to The Kendall Company, Boston, Mass., a corporation of Massachusetts Original No. 2,962,885, dated Dec. 6, 1960, Ser. No. 817,774, June 3, 1959. Application for reissue May 5, 1961, Ser. No. 108,709
21 Claims. (Cl. 66—178)

Matter enclosed in heavy brackets [ ] appears in the original patent but forms no part of this reissue specification; matter printed in italics indicates the additions made by reissue.

This invention is concerned with very snug-fitting sheer streetwear ladies' knitted stockings and with shaped generally tubular stretchable and retractive knitted garments having a plurality of different diameters in the general range of fineness and sheerness of ladies' streetwear stockings. In particular, this invention is concerned with a new type of streetwear stocking and with other generally tubular shaped new type garments with knitted body portions of very sheer and fine knit stitches of fine non-elastomeric yarn but incorporating substantially-relaxed stretchable, retractive yarns with major portions thereof extending coursewise and generally defining, by their relaxed coursewise length, the relaxed shape of the body portion. In general, the garments of this invention are of the non-rib body portion type which may be knitted on a single needle knitting system.

The non-rib body portion of garments of this invention may be knitted on any knitting system with provisions for knitting plain jersey stitches either alone or including patterned areas such as fabric incorporating plain jersey stitches, tucked stitches and floated yarn combinations. For example, the conventional circular hosiery machine equipped with dials or modified dials for knitting rib tops and automatic welts is a suitable needle system for the purpose of this invention. Likewise, the flat bed full-fashioned machine is a suitable system as used in the invention. The Burson knitting machine and other double bed V type machines are suitable systems when knitting is performed alternatively on one needle bed at a time. The invention also applies to all plain circular knitting machines such as sinker top and body machines for underwear and outerwear. Links and links machines with superimposed cylinders or flat machines with opposing needle beds may also operate as suitable needle knitting systems.

Heretofore, garments incorporating elastomeric yarns have been of several types. Men's socks incorporating inlaid rubber yarns in the top or welt portion (usually ribbed) to provide a garter effect are well known. These garments in the portion where the rubber yarn is incorporated are cylindrical in shape and do not use the principle of varying the tension on the rubber thread or variable metering during manufacture to shape the stocking to fit the different diameters of the leg. Other garments incorporating rubber yarn are full length elastic stockings and girdles which heretofore have been either of heavy thick rib knit or open mesh construction with inlaid heavy covered rubber yarns or the more popular plain knit type with rubber yarns forming the knit stitches. This latter construction has been made of very fine covered rubber yarns of the order of 160 core (diameters per inch bare). Covered yarns have proven necessary, however, because bare rubber, when it makes over-all contact with human skin, has a cold, clammy, unpleasant feel. Covered yarns have also proven necessary from a practical standpoint to add strength because knitted stitches must bear the strain of garter support which is greater with garments having considerable longitudinal elasticity and bare rubber is somewhat lacking in flex strength. Garments of this type have, therefore, been knitted of rubber yarns having helical windings of nylon or other relatively strong material covering a rubber core. These windings covering even the finest rubber cores in every stitch detract considerably from the hand and transparency of the garment and add weight and bulk to it.

Heretofore, fine streetwear ladies' stockings, whether of the full-fashioned or of the seamless type, and whether of normal yarns or of stretch or torque yarns have had the disadvantage that unless they are constantly supported as by garter clamps suspended from a waist encircling garment and exerting longitudinal pull, they do not properly fit the leg. This longitudinal pull exerted by the garter distorts the stitches longitudinally and thus reduces the width of the individual stitches and the whole diameter of the stocking as far as the leg will permit. However, those portions of the stocking where rather continuous flexing is not unusual in use, such as the ankle or knee portion, progressively stretch locally during extended periods of wear so that at the end of the day the ankle and knee portions particularly have been distorted to the point where they no longer fit snugly but rather have a baggy wrinkled appearance.

It is one of the objects of this invention to provide full length streetwear ladies' stockings which require a minimum of garter support and which are of such fineness and stitch density as to appear gossamer and substantially transparent on the leg, yet which fit the leg in all portions thereof.

It is an other object of this invention to provide below-the-knee streetwear stockings which are entirely self-supporting and which are of such fineness and stitch density as to appear gossamer and substantially transparent on the leg and which fit the leg in all portions thereof.

It is a further object of this invention to provide other generally tubular shaped garments which are self-supporting and which are of such fineness and stitch density as to appear gossamer and substantially transparent when worn and which closely contact the body part over which the garment is worn where such contact is desired.

It is an additional object of this invention to provide various very sheer elastic circumferentially shaped knitted tubular garments such as stockings, anklets, wristlets, knee binders, girdles and the like, of plain jersey, tuck, or combination knit stitches with bare stretchable, retractive yarns at least partially shaping the garment to different diameters with major portions extending coursewise in the body portion of the knitted fabric and locked-in at frequent intervals.

It is an important object of this invention to produce elastic garments which have knitted stitches of one size with inlaid bare stretchable, retractive yarn of a given coursewise relaxed length in one area of the knitted body and have knitted stitches of a smaller size with inlaid bare elastic yarn of a lesser coursewise relaxed length in another area of the knitted body.

Other objects and advantages of the invention will be apparent from the following description thereof in connection with the accompanying drawings in which.

Figure 1:
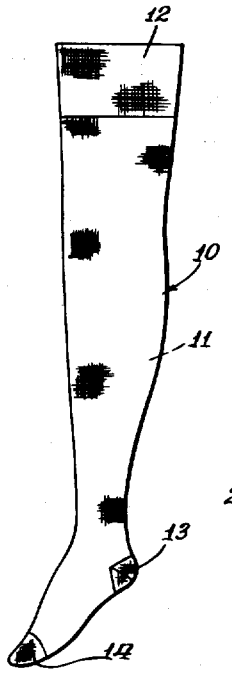
FIG. 1 illustrates a side view of a full length lady's stocking of this invention.

Referring now to the drawings.

FIG. 1 illustrates a side view of an ultra sheer streetwear lady's stocking 10 of this invention including a knitted body portion 11 wherein bare retractive yarns are normally incorporated, a top 12 including a turned welt, preferably of the automatic type, usually of heavier non-elastic yarns, a heel 13 and a toe 14. The latter portions and the top 12 may be of any of the materials normally used for similar purposes in streetwear stockings.

Figure 2:
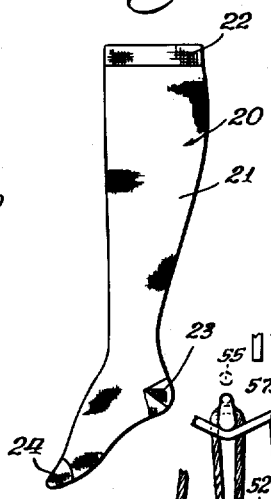
FIG. 2 illustrates a side view of a below-the-knee stocking of this invention.

FIG. 2 illustrates a very sheer self-supporting below-the-knee stocking 20 of this invention which may be worn by either sex. Again the stocking consists of a knitted body 21 wherein bare retractive yarns are incorporated. The top of this stocking may consist of a turned welt of heavier non-elastic yarn or a turned welt of the same material including retractive yarns as the body or the top may merely be an unturned continuation of the body with modified stitch or inlay construction.

Figure 3:
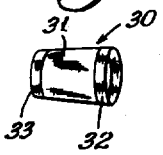
FIG. 3 illustrates a wristlet made in accordance with this invention.

In FIG. 3 a sheer stocking fabric wristlet 30 has a knitted body portion 31, a bottom welt 33 and a top welt 32. The entire garment may be of similar material incorporating bare retractive yarn with or without turned welt. If desirable, the end portions may be left plain and overedged.

Figure 4:
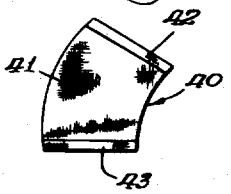
FIG. 4 illustrates a shaped knee binder made in accordance with this invention.

In FIG. 4 the very sheer stocking fabric knee binder 40 has a shaped knitted body 41 incorporating a retractive yarn and turned welts 42 and 43 may be of the same or different material. Alternatively, the ends may be left plain and overedged. Shaped articles where the axis of the tube is curved, such as the knee binder 40, may be made using a panel of tuck stitches in the under knee portion and plain jersey stitches in the front portion. The retractive yarn might be inlaid in every course of the tuck stitch panel and in alternate courses of the jersey stitch portion. Alternatively, the binder 40 may be made in the form of a truncated conical tube of plain knit stitches of thermoplastic yarn with inlaid thermoplastic elastomeric yarn. Localized shaping, curving the tube axis may be achieved afterwards by preboarding as will be explained hereinafter. Combinations of these two methods may also be advantageously utilized.

Figure 5:
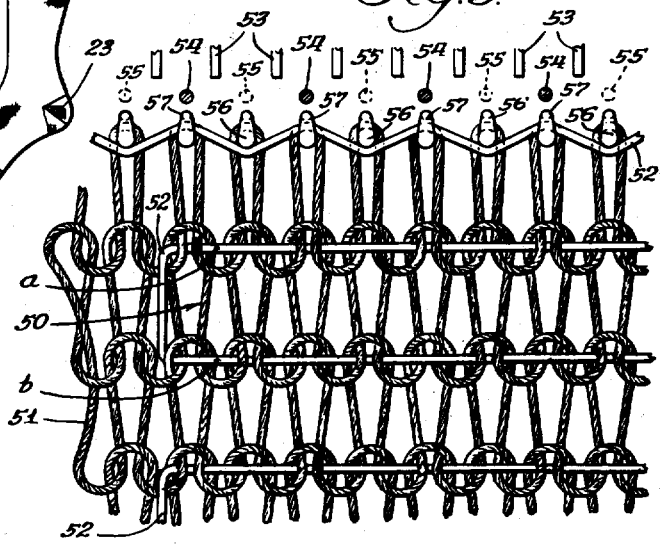
FIG. 5 illustrates a step in the method of making a garment of this invention on a full-fashioned knitting machine and an enlarged portion of fabric knitted thereby viewed from the inside.

In FIG. 5 a step in the method of making a full-fashioned very sheer garment of the invention is illustrated. The sinkers 53 place the retractive yarn 52 which is furnished by a separate carrier against the shanks of the raised needles on the hook side. Above the alternate needles 56, picot points 55 descend to close the beards. The retractive yarn, carried in the notch of the sinkers, is fed into the hooks of the unclosed intermediate needles 57, and against the picot points at the alternate needles as the needles are depressed. When the sinkers are withdrawn and the needles depressed further, the retractive yarn lies in the hooks of the intermediate needles 57 and against the beard of the alternate needles 56. As the needles are further depressed, the retractive yarn rests above the alternate needles on the knock-over bits and in the hooks of intermediate needles. At this point, the picot points are depressed again to close the alternate needles thus causing the retractive yarn to pass behind the alternate needles when the needles are raised, whereupon the retractive yarn lies against the needle shanks in front of the intermediate needles and behind the alternate needles. At this point, illustrated in FIGURE 5, the picot points are shifted to positions 54. The knitting operation follows the retractive yarn positioning operation as will be explained in connection with FIG. 7. When the picot points are in the positions 55, the retractive yarn is positioned with respect to the needles as is illustrated in FIG. 5, and the retractive yarn is laid into the fabric as at "b." When, however, the picot points are in position 54, the retractive yarn 52 is positioned on the opposite side of each needle from the position illustrated, consequently, the retractive yarn is laid into the fabric as at "a." It will be noted that preferably a portion of knitted fabric without inlaid retractive yarn exists at the garment blank edges. This fabric may conveniently be used in making a thin seam.

Figure 6:
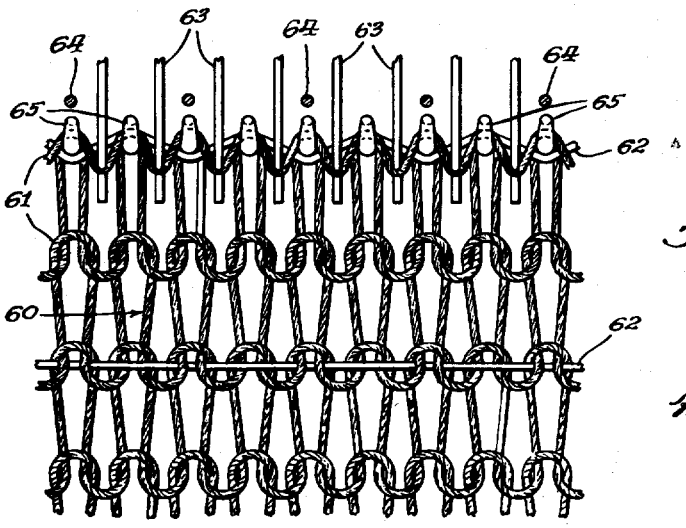
FIG. 6 illustrates a further step in the method of making a garment of this invention on a full-fashioned knitting machine and an enlarged portion of an alternate type of fabric of this invention viewed from the inside.

In FIG. 6 is illustrated a further step in the method of making a full-fashioned garment of this invention. It will be noted that the fabric 60 has a retractive yarn 62 inlaid only in alternate courses, but on the full-fashioned machine this may be accomplished by taking the retractive yarn carrier out of action on alternate courses. The figure illustrates the placing of the knitting yarn 61 in the hooks of the needles 65 by the sinkers 63. The picot points 64 which always operate on the same needle in this case operate in the way previously explained to position the retractive yarn prior to the knitting operation.

Figure 7:
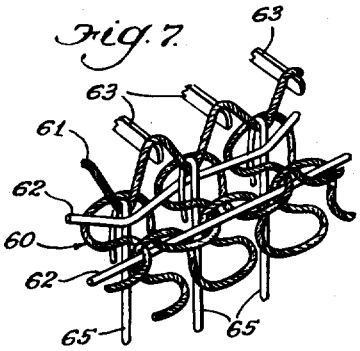
FIG. 7 illustrates an enlarged view showing the method whereby the retractive yarn is inlaid on a full-fashioned machine.

FIG. 7 illustrates the needles 65 in the process of drawing a new loop of yarn 61 shown in the hooks of the needles through the old loops. The beards of the needles are closed prior to contacting the old loops and the retractive yarn by contact with the presser bar as the needle descends as in ordinary full-fashioned knitting. The fabric 60 is similar to that shown in FIG. 6 except that retractive yarn in fabric 60 is inlaid in every course.

Figure 8:
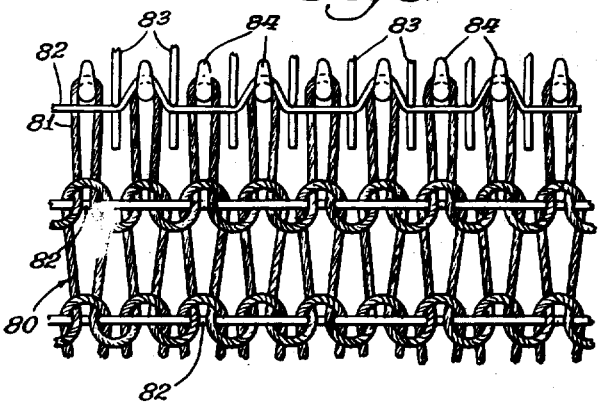
FIG. 8 illustrates a step in the method of making a garment of this invention on a seamless circular knitting machine and an enlarged portion of the preferred type of fabric of this invention formed as viewed from the inside.

In FIG. 8 is illustrated a method of making a preferred garment of this invention on the circular machine. Fabric 80 consists of knitted yarn 81 with retractive yarn 82 inlaid in every course. In the method, alternate needles are partially raised to take the retractive yarn 82 in the alternate needle hooks and pull it down, whereupon the sinkers push the retractive yarn over and beyond the intermediate needles as illustrated. As the needles rise to take knitting yarn in their hooks, the retractive yarn being held down by the sinkers cannot rise. The retractive yarn, therefore, slides relatively over the latches on the alternate needles and down and in front of the shanks. At the same time the retractive yarn slides relatively down and behind the shanks of the intermediate needles. When the needles retract to form new loops and cast off the old loops, the retractive yarn in front of the alternate needles is also cast off.

Figure 9:
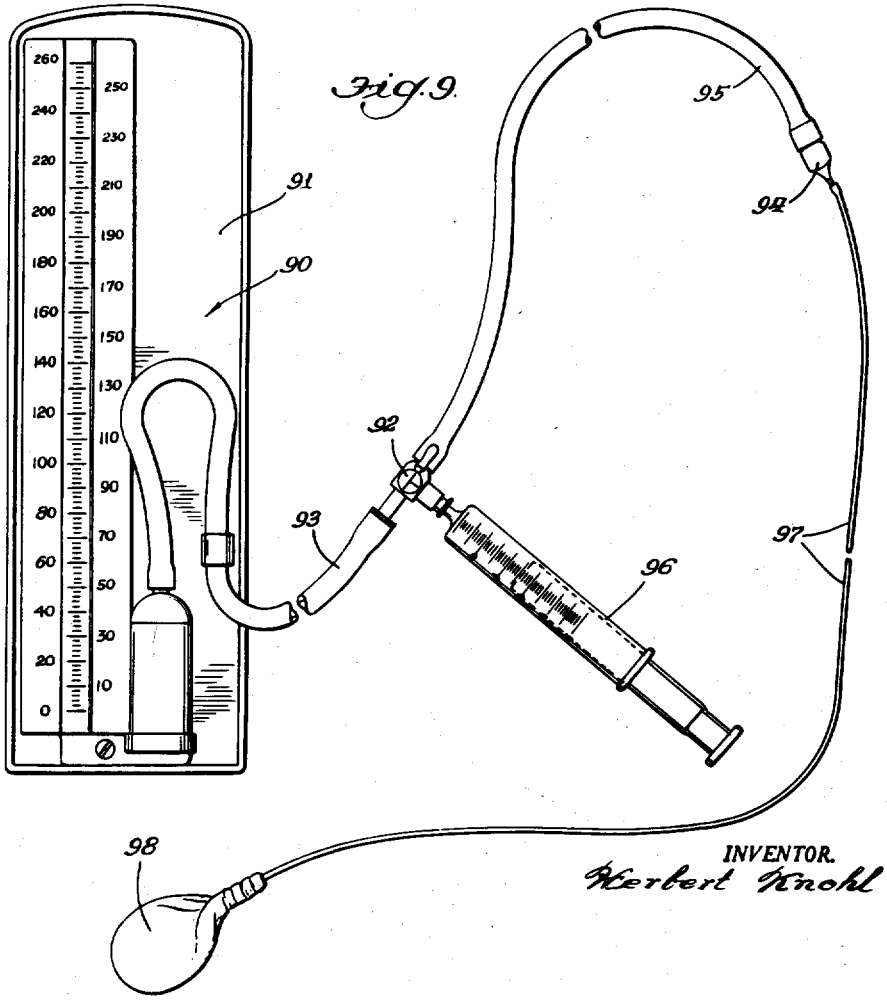
FIG. 9 illustrates the apparatus by means of which the retractive force or support pressure in millimeters of mercury of a garment of this invention is measured while the garment is being worn.

In FIG. 9 is illustrated the apparatus 90 by means of which the retractive force or support pressure in millimeters of mercury of a garment of this invention is measured while the garment is being worn or is stretched on a form. A manometer 91 is graduated to indicate pressure in millimeters of mercury. The manometer is attached by a rubber hose 93 to a three-way stop cock 92 to which is attached the hose 95 and the glass syringe 96 graduated in cubic centimeters. Hose 95 is in turn attached to a hypodermic needle 94, the needle end of which has been cut off to make a short hollow projection. This needle projection in turn fits into a size 8 veneral catheter 97 which carries on its end a flat rubber bladder 98 each of whose flat faces has an area of about one square inch. The whole arrangement is made airtight. Upon being inflated with 5 cc. of air, using the glass syringe, the bladder should be of such modulus as to exert about 20 mm. of mercury pressure as measured on the manometer. I find that the rubber sheeting in ordinary surgeon's gloves has characteristics permitting bladders of the type described to be made.

The objects of this invention are attained by the incorporation, into the very sheer non-rib body portion fabric of fine knit garments, of bare retractive yarns in such a way that the sheerness and gossamer appearance of the garment are not destroyed, although shaping to a plurality of different diameters is achieved. This preferably can be accomplished in accordance with the invention by the use of bare retractive yarns which are incorporated so that major portions of the retractive yarn extend coursewise of the fabric, preferably by being inlaid in every course, but in any event being locked into the fabric at frequent intervals in every course in which it occurs.

The stretchable, retractive yarns (sometimes herein referred to merely as "retractive" yarns) included in the garments of this invention are preferably of natural rubber, synthetic rubber or other elastomer. Certain polymers and/or copolymers including, but not restricted to, those of the polyamide (nylon), polyurethane, halogenated polyethylene and polyvinyl types may exist either in elastomeric or non-elastomeric form depending on the choice of monomers or reactants, the nature or degree of polymerization, the presence of plasticizers, or the use of other methods or techniques well known to the art. One such elastomeric yarn, believed to be of the polyurethane type, is manufactured by E. I. du Pont & Co. and sold under the name "Fiber K." This yarn is highly suitable as the elastic retractive yarn employed in the garments of this invention.

I may also employ retractive yarns of non-elastomeric materials, which yarns have elastic properties because of their method of manufacture, arrangement or physical, chemical or other treatment, as the stretchable, retractive yarns in the garments of this invention.

Preferably, relatively little elastomeric yarn appears in stitch form and then never as the sole yarn in the products of my invention. In most commercial garments of my invention, less than 20% of the knitted stitches in the body portion of the garment contain such yarn, and these stitches also contain the normal structural yarns of the garment in plated or other knitted relationship in the same stitches with the elastomeric yarns so as to minimize the strain on the latter yarn. Such knitted elastomeric stitches have the effect of increasing the tendency of the garment to pull down since the elastic yarns are in stretched condition when the garment is being worn. Furthermore, knitted elastomeric stitches have the effect of decreasing the apparent transparency (transmitted light factor as hereinafter explained) of the garment. Both of these effects are undesirable and are accentuated as the total bulk of knitted elastomeric yarn in the knitted stitches is increased. When the percentage of stitches in the garment which include elastomeric yarn exceeds about 70%, the advantages of my invention are so far dissipated that the garments have little in common with my preferred structures. This percentage will be somewhat less with relatively coarse elastomeric yarns and somewhat higher with relatively fine elastomeric yarns however.

The preferred stockings of the present invention, therefore, are characterized by the fact that they are substantially free of elastomeric yarns in the knitted stitches, the bare elastic yarn being incorporated by inlaying into the knitted body courses to provide a plurality of diameters which determine fit and/or pressure support primarily in the circumferential direction. Concentration of the elastomeric yarn in the inlay produces a stocking in which the circumferential elastic and retractive properties are largely distinct from the lengthwise elastic properties so that, while the stocking may have considerable elongation in the lengthwise direction, the preferred stockings do not have a strong component of retractive force when stretched in this direction. Thus, the stockings are more comfortable because there is less tension on the toes, and the stocking has less tendency to slip down when worn.

The stockings of this invention wear extremely well because bare, elastomeric yarn is not utilized as the sole yarn in the knitted stitches. The preferred stockings have the elastomeric yarns concentrated in the inlay where they are not subject to the more severe strains and stresses of the yarns in the knitted stitches. These portions of elastomeric yarn which are formed into knitted stitches in the body of the garments of this invention are advantageously in plated relationship or are otherwise knitted in the same stitches with other non-elastomeric yarns such as nylon, which limit the stress and strain on the elastomeric yarn. In any event, whether the stretchable retractive yarn is elastomeric or derives its elastic properties from its physical arrangement or other means, it is always separately incorporated in the body portion of the garment, so that the structural network of the knitted stitches is not dependent upon the retractive yarn. Thus, although the retractive yarn which runs in a generally coursewise direction may sometimes be included in a knitted stitch as hereinbefore described, a non-elastomeric yarn of the knitted structural network is always present in the same stitch. Consequently, if the elastic yarn is snagged or broken, whether in the stitch or elsewhere, its free ends do not cause a so-called "run." Rather, the free ends are locked in place at frequent intervals by the extremely fine body stitches (which are characteristic of the garments of this invention) and in the case of inlay yarn, by the over and under pattern; whereby the function and appearance of the stocking are substantially unimpaired.

With regard to functionality, the garments of this invention also vary greatly. They may merely provide a snug fit in some cases; or with garments of greater retractive force, they may provide support for so-called "tired legs." Garments possessing still greater retractive force may furnish compressive support for weak or sprained joints or provide support and treatment for varicose conditions. In any event, all of the garments have these things in common, they have ultra-sheer body portions and they each incorporate in the body portion bare retractive yarn with major portions extending coursewise which shape the body portion to a plurality of diameters and cause it, when worn in the stretched condition, to exert retractive force tending to reduce the diameter of the body portion.

The fine knitted stitches of the body portion of the preferred stockings of this invention largely determine the lengthwise stretch of the garment. Every such stitch contains fine structural yarn of such non-elastomeric natural or synthetic materials as nylon, silk and the like. Yarn of elastomeric material such as natural and synthetic rubber lacks sufficient strength, toughness and abrasion resistance for use as a structural yarn unless it is so coarse as to add bulkiness, thus sacrificing the sheerness and appearance of transparency characteristic of the garments of my invention.

The structural yarns used in the body portion may be of the same material or of different material in different courses. Some courses may be of short stitches while other courses are of relatively long stitches or the individual stitches may vary in size. The yarns may be of balanced twist or they may be twisted with an unbalanced twist in either the S or Z direction. They may consist of "stretch" and/or "torque" S and Z twist in alternate courses or in other course relationship or the individual stitches may each contain an S and a Z twist yarn in plated relationship or either of these torque or twist yarns plated with stretch yarns. The yarns of the knitted stitches may be of the "Helenca" type wherein the multifilament yarns are kinked and deformed and set in that condition by heat. Or the yarns may be of the inherently lively type which are knitted as non-lively yarns, but which upon being subjected to a heat treatment become lively. Likewise, combinations of these and plain yarns may be used.

Although not a prefered type of garment, somewhat more longitudinal stretch may be provided in the garments of this invention by knitting-in the retractive yarn with body stitches as hereinbefore indicated in plated or other knitted relationship in the same stitches in certain wales preferably spaced and preferably in different wales in adjacent courses. This may be done as is illustrated in the Martel Patent No. 2,102,369 where the retractive yarn is plated in the individual stitch with the knitted yarn. This method produces a durable stocking since where the yarn is elastomeric it is not subjected to longitudinal force beyond its elastic range. However, where there are long floats between retractive knitted stitches, I prefer to inlay the retractive yarn between knitted retractive stitches.

The knitted yarns of the stockings of this invention may vary in diameter corresponding to nylon yarns of 7 denier and less to 60 denier and of tensile strength such that when knitted into the high stretched-stitch density stockings of this invention, the fabric will have a bursting strength, when constructed of the finest yarns, of at least 15 pounds per square inch measure on the Mullen tester. Where full therapeutic support is provided, however, a bursting strength of at least 30 pounds per square inch is preferred.

The garments of this invention are preferably knitted either on full-fashioned machines or on circular machines. Suitable full-fashioned machines are those in the range of 45 to 90 gauge with 30 to 60 needles per inch. Suitable circular machines with 3½ to 6 inch diameter cylinders for stockings and other circular machines up to 30 inches in diameter are also in the range of 30 to 60 needles per inch, although the highest needle density per inch now available is about 40 on the 4 inch 504 needle or on the 3¾ inch 474 needle circular machine.

The retractive yarn inlaying mechanism and method which may be utilized with the full-fashioned machine may be of the type illustrated in the Gastrich Patent No. 2,185,844 or alternatively the method and device illustrated in the Verbeek Patent No. 2,054,686 or other known methods and devices such as those in the Ruedt Patent No. 2,251,805, or in the Schwartz Patent No. 2,230,388 may be utilized.

The retractive yarn inlaying mechanism and method which may be utilized with the circular machine may be similar to that used in the Getaz Patent No. 2,230,402 or the Page Patent No. 2,083,394 or by other well known methods such as that described in the Scott Patent No. 1,641,544. Where the desirable needles per inch ratio is extremely high, however, it may be necessary to utilize beard type needles and the knitting system corresponding to such needles. A Pigeon type circular knitting machine has been produced with such beard type needles.

In general, it is preferred to inlay the retractive yarns in every course of knitted stitches, but alternatively the yarn may be inlaid only in alternate courses, every third course or in other variations. Preferably where the retractive yarn is not incorporated in every course, its feed is not removed from operation but the machine is provided with one or more additional feeding stations for the courses incorporating no bare retractive yarn.

It is also prefered because of the simplicity of the system and the better shielding of the retractive yarn to inlay the latter behind hooks of alternate needles and in the hooks of intermediate needles. When circular machines of even number needles are used, this system causes the retractive yarn to always have the same position with regard to a given wale. When circular machines of odd number needles are used with a pattern wheel, the system causes the retractive yarn to lie in a staggered arrangement with respect to the wales similar to the arrangement in FIG. 5 with regard to "a" and "b."

In this respect, the uniform arrangement, as is illustrated in FIG. 8, has a more pleasing and uniform appearance.

But pattern drums or jack manipulation may be utilized in the conventional manner to vary the path of the retractive yarn so that it passes on the same side of more than one needle, thus reducing the points where the retractive yarn is locked-in with the knitted stitches. However, it must be realized that numerous tie-ins are helpful in preventing puckering, in protecting the bare yarn against abrasion and snagging and the like.

Because of their high speed constant uniform motion and the ease of control of the bare retractive yarn which must necessarily be under some tension, it is preferred to utilize circular knitting machines for the products of this invention. In addition to the usual circular knitting machines equipped for inlaying, the Reymes-Cole circular machine which permits adding wales and which is illustrated in U.S. Patent No. 2,703,970 may be equipped with inlaying devices and utilized.

When the full-fashioned knitting machine is utilized, it is preferred to stop the inlaying somewhat short of the edge of the knitted fabric blank on either side, as is illustrated in FIG. 5, thus creating an area with no retractive yarns so that the knitted yarns may be utilized in this area in making a very thin back seam.

The bare retractive yarns of the garment of this invention, whether they are inherently elastic due to their elastomeric nature or are elastic due to treatment, may be very fine and yarns as fine as 7 denier and less may be used, both monofilament and multifilament yarns being suitable.

In comparing the fineness of some of the stockings of this invention with other stockings, the number of stitches in a square inch of fabric fully stretched in both directions, hereinafter referred to as the stretched stitch density, is utilized. Heretofore, ladies' stockings for street wear have ranged in stretched stitch density from about 1350 to 2900 stitches per square inch, while fully therapeutic stockings have usually ranged in stretched stitch density from 350 to 700 stitches per square inch. The stockings of this invention are in the stretched stitch density range of about 1000 to 4000 stitches per square inch.

Heretofore, there has been necessarily a practical limit to the fineness of the yarns used in streetwear stockings because the knitted fabric must take the tremendous pressure imposed on that portion of the stocking covering the knees when the knees are bent, thereby increasing the stocking diameter and the over the knee leg length simultaneously. The stocking is strained to the utmost in attempting to conform to these altered dimensions. Because high bursting strengths are necessary in such stockings, 15 denier nylon yarns are universally used. There is a 75 gauge full-fashioned stocking on the market which utilizes 10 denier nylon in the body, but the delicacy of these garments relegates them to the carriage trade. An experimental 90 gauge full-fashioned machine which is capable of knitting even finer stockings has been used, but its products did not prove to be a commercial success.

There is an additional problem which has caused difficulty with regard to seamless stockings of the usual type. Such stockings have the same number of wales in the top as are in the angle, and since both have to be fitted, the seamless stocking has been a compromise. The fineness of full-fashioned stockings has not been achieved. A 4 inch seamles machine with 504 needles (or about 40 to the inch) appears to be near the practical limit for machine fineness using present methods. Increasing the needles per inch or increasing the cylinder diameter causes the ankle to be too loose. The use of torque yarns of alternating S and Z twist yarns have helped this situation, but it is necessary to keep such stockings tautly supported if S and Z twist yarns are relied upon to tighten the ankles.

The stockings of this invention have a definite advantage over previous seamless and full-fashioned stockings in that the retractive yarn tends to reduce the limp circumferential dimensions of the finished garment so that it is possible to use more knitted wales in the garment circumference without making it too large. These added wales help in two ways. They make the fabric stronger and they reduce the strain by reducing the amount each stitch must widen to accommodate the increased circumference of the bent knee, and hence they reduce the amount each stitch must shorten against the pull of the garter clamps. Viewed in another way, the stockings of this invention may be made finer in practical strengths than stockings have ever been made before. The invention permits the use of larger circular knitting machine cylinders and wider full-fashioned stocking blanks or the use of more needles per inch, or both, than have been practical heretofore.

With a given retractive yarn and within its retractive and stretch limits it is possible to vary the limp dimension of any portion of the garment considerably merely by metering into the fabric different amounts of retractive yarn either by tensioning devices or otherwise. Using 20 denier monofilament yarn in the knitted stitches and inlaying bare 150 denier "Fiber K" yarn in every course, I produced fabric of the same stretched stitch density (1950 stitches per square inch) on a 3¾ inch 400 needle circular knitting machine which in one case had a limp circumference of 3⅝ inches and in another case a limp circumference of 6½ inches. The larger fabric, which had a fully stretched circumference of 17 inches, when placed on a 9 inch circumference ankle induced a pleasant supportive sensation falling in the lower portion of the therapeutic range with 15 millimeters of mercury pressure-support measured as will hereinafter be fully explained. The smaller fabric, which had a stretched circumference of 12 inches, had more definite compression higher than the usual therapeutic range when placed on a 9 inch circumference ankle and produced 31 millimeters of mercury pressure-support.

Using 15 denier monofilament yarn in the knitted stitches and inlaying bare 160 core rubber (160 diameters measure one inch) in every course, I produced fabric of the same stretched stitch density (2240 stitches per square inch) on a 3¾ inch 400 needle circular knitting machine which, in one case, had a limp circumference of 2½ inches and in another case 7¼ inches. The larger fabric, which had a fully stretched circumference of 19 inches, when placed on a 9 inch circumference ankle induced a pleasant clinging sensation and produced only 5 millimeters of mercury pressure-support measured as will hereinafter be fully explained. The smaller fabric, which had a stretched circumference of 15 inches, had more definite compression in the therapeutic range when placed on a 9 inch circumference ankle and produced 20 millimeters of mercury pressure-support.

Pressure-support possessed by a garment may also be changed within limits by varying the stitch size in different portions of the garment. It is customary to decrease the stitch size progressively from the top to the ankle of a seamless stocking. It is obvious that where the stitches are shorter, the helical loops of retractive yarn inlaid in the courses are closer together, and hence the pressure-support resulting from a given tension on a given retractive yarn is increased in the area of shorter stitches. This effect, due to variations in length of stitches, is, however, usually subordinated to the variation in pressure-support caused by the predetermined variation either in metered length or tension on the retractive yarn as it is knitted.

The limp dimensions of the stockings of this invention depend upon a number of circumstances. Obviously the limp dimensions of a stocking should be such as to make them as easy to put on as circumstances will permit.

Increasing the size of the cylinder where circular machines are used or of the pattern blank where full-fashioned machines are used is the most obvious way of increasing the limp dimensions other factors remaining constant. But limp dimensions also vary with the bulk of the knitted stitch yarns. A bulky yarn will cause the limp dimensions to be larger than a finer knitted yarn. The limp dimensions also may be varied by increasing the needles per inch. A finer gauge full-fashioned machine or a circular machine of greater needle density will give larger limp dimensions than coarser machines using the same course width or the same diameter cylinders. By far the greatest factor in determining the limp dimensions of the stockings of this invention, however (assuming that the knitted stitches form a garment sufficiently large to accommodate the leg), is the type of inlaid retractive yarn and the conditions under which it is inlaid. For instance, a yarn having a very low modulus of elasticity causes a larger limp dimension than a higher modulus yarn which is able to draw-in the fabric to a greater degree when both are inlaid with the same elongation. Likewise, short stretch (i.e. up to 300% elongation) inlaid yarns produce larger fabric than long stretch (i.e. up to 600% elongation) inlaid yarns if both are knitted at dead stretch. Similarly, yarn inlaid under tension which elongates it 300% causes limp dimensions larger than when it is inlaid under tension which elongates it 500%. Some of the stockings of this invention provide, for the first time, a new and novel method of altering the limp dimensions of circumferentially retractable stockings while altering but not destroying the retractable nature of the garment. I have found that where both the knitted stitch yarns and the elastomeric inlaid yarns are thermoplastic, the stocking may be preboarded to change its limp dimensions dramatically, approaching closely but always smaller than the circumferential proportions of a particular size leg to be fitted. For instance, with nylon knitted stitches and "Fiber K" polyurethane-type inlaid yarns, a fabric with a limp circumference of 4 inches may be stretched over a board and subjected to temperatures in the range of 260°–300° F. for 2 minutes to produce a limp circumference of 6 inches. The fully stretched width is only slightly increased by this treatment and the "Fiber K" yarn appears to be somewhat decreased in elastic modulus (15–20%), but this decrease can be compensated for by using slightly higher elastic modulus yarns initially. In any event, stockings with full therapeutic support characteristics may be produced after preboarding. Alternatively, with thermoplastic elastomeric yarns, the yarn may be given a pretreatment prior to inlaying it into the garment whereby the elastomeric yarn is converted into a shorter stretch, lower elastic modulus yarn and this when inlaid under the same conditions gives a garment of larger limp dimensions and reduced support-pressure. My preferred method of pretreating these thermoplastic elastomeric yarns is to draw them at a temperature such that the yarn is softened but not melted. I prefer to use a ceramic tube heated by a coil of resistance wire. The yarn is run through the tube without contact. With "Fiber K" polyurethane-type yarns, I use an inside tube temperature of 340°–350° F. and draw the yarn about 160% at a take-up speed of 7 yards per minute. The yarn produced has about ½ the elastic modulus and total stretch and about ½ the cross sectional area of the original yarn. It is very uniform. This process may be repeated preferably by tandem methods until a very low modulus, short stretch yarn is produced.

With regard to transparency, the garments of this invention are most transparent when they are made of unfilled and undyed yarns. Dyeing such garments somewhat diminishes the apparent transparency, particularly in the darker shades. In order to eliminate the effect of dyeing and filling, all measurements of transparencies were taken on uniformly dyed beige stockings made with unfilled yarns. Using a 60 watt frosted light bulb within a transparent form, a light meter placed 14 inches from the bulb gave a reading of 30 foot candles without stocking fabric on the form. Normal 15 denier beige street-wear stockings in the range of stretched stitch densities of 1500 to 2200 stitches per square inch when placed on the form under the same conditions gave readings of transmitted light of 27 to 29 foot candles. For purposes of this invention, the transmitted light factor will be expressed as a fraction, with the denominator as 30 and the numerator the transmitted light in foot candles through the form and stocking. Beige stockings of this invention of 7 denier nylon yarn in the knitted stitches with 7 denier "Fiber K" polyurethan-type yarn inlaid in every course to give a slight clinging action to the stocking when worn, and with a stretched stitch density averaging 2400 stitches per square inch, have a transmitted light factor of 29/30 under these conditions. Beige stockings of this invention of 7 denier nylon yarn in the knitted stitches with 300 core bare rubber yarn inlaid in every course to give a slight clinging action to the stocking when worn, and with a stretched stitch density averaging 2400 stitches per square inch, had a transmitted light factor of 27/30 under the same conditions. Other beige stockings of this invention of higher denier knitted yarns and of greater retractive force ranging up to and including full therapeutic range have transmitted light factors of 20/30 to 29/30 under the same conditions. The finest elastic stockings available prior to this invention have a range of about 9/30 transmitted light factor for fully therapeutic stockings. So-called "tired leg" non-elastomeric stockings made from alternate S and Z twist yarns of heavy denier nylon have a transmitted light factor of about 20/30.

It should be understood that while the preferred garments of this invention employ yarns which are filled or dyed only to a minor degree, so as to provide maximum transparency, in other embodiments of my invention the yarns may be opaque and/or dyed to dark shades reducing the transmitted light factor, but preserving a sheer, light-weight garment.

With regard to pressure-support, one very effective method of measuring such support is to utilize a mercury manometer, of the type used for measuring blood pressure, modified as in FIG. 9. In actual practice the instrument bladder is inflated with 5 cc. of air using the glass syringe, whereupon the bladder inflation pressure is measured. Then the uninflated bladder is placed between the stocking and the wearer's leg, again inflated with 5 cc. of air and the pressure read. The difference between this latter reading and the bladder inflation pressure is the pressure-support in mm. of mercury as that term is used in this application. I have found in over 20 years of experience in the business of manufacturing elastic stockings that pressure-supports, as above measured, in the range of 15–24 mm. of mercury at the ankle and diminishing gradually 1–2 mm. each in the calf, the knee and the thigh are entirely satisfactory for therapeutic stockings.

In pressure-support ranges short of therapeutic support and of about 10–15 mm. of mercury, stockings of this invention are suitable in relieving the condition commonly known as "tired legs." In this range, stockings of the invention are also suitable as leg slimming devices acting to firm the legs in the same way that an elastic girdle reduces the prominence of the dierriére.

A further range of useful garments of this invention exists in the pressure-support range below 10 mm. and down to about 5 mm. of mercury. This range of pressure-support provides a definite pleasant clinging sensation in sheer stockings which causes the stocking always to fit the leg with a minimum of garter pull. In this range, extremely fine, perfectly fitting stockings may be provided with what would ordinarily be so many wales that the stocking would be too large both in the ankle and in the knee but which, in this instance, provide sufficient extra tensile strength at the knee to make stockings of hitherto impractically fine yarn, entirely practical. Ninety-gauge stockings made of 7 denier yarns are practical garments when made in accordance with this invention.

Ultra-sheer garments other than stockings can be made in accordance with this invention in the same ranges of pressure-support and with the same transmitted light factors as stockings which were chosen for purposes of illustration only.

Typical garments made in accordance with this invention were knitted as follows:

EXAMPLE I

Using the 474 needle 3¾ inch cylinder knitting machine known to the trade as the Scott and Williams model KN machine, a 60 denier, preshrunk, multifilament yarn with 10 turns of S twist was used for making the turned automatic welt with the stitch cam set to produce a stretched fabric of about 26 inches' circumference. Upon completion of the welt, the 60 denier nylon yarn was removed from action and the shadow welt was begun, the feed furnishing 40 denier multifilament nylon with 7 turns Z twist plated over 20 denier multifilament nylon with 7 turns S twist. In the last course of the shadow welt an additional inlay feed was introduced and about 9½ inches limp of 75 denier "Fiber K" polyurethane-type yarn with 600% stretch was inlaid in every course. When the last shadow course was complete, its yarns were replaced by the leg body yarn which was a 20 denier multifilament nylon yarn with 30 turns of S twist. At this point, the measured length of "Fiber K" yarn inlaid in each course was gradually decreased by increasing the tension until at a point about 4½ inches below the shadow welt it measured 8⅛ inches per round. Thereafter the amount of "Fiber K" yarn inlaid in a course remained constant to a point about a foot below the shadow welt. At this point, the stitch cams which previously had been producing stretched fabric measuring 26 inches in circumference began to reduce the stitch size at a constant rate until the ankle was reached about 29¼ inches from the stocking top at which point the stretch circumference was 16 inches. Simultaneously, the inlaid "Fiber K" yarn in each course was gradually reduced until at the ankle about 5½ inches of polyurethane yarn was laid in a round. Both the knitted fabric and the "Fiber K" yarn were kept constant from this point until the heel was reached whereupon the "Fiber K" yarn was withheld and 60 denier nylon multifilament yarn with 10 turns S or Z twist was substituted for the 20 denier body nylon yarns. The heel was knitted automatically by reciprocation on part of the needles after which the body yarn and "Fiber K" yarn were again introduced and knitting proceeded to the toe. At this point, the body yarn and the "Fiber K" yarns were removed from action and the body yarn was replaced by 60 denier multifilament nylon with 10 turns S or Z twist. Afterwards, the open toe was closed by looping across the toes under the foot. The stocking above produced was pre-boarded at 280°–300° F. for 2 minutes to give a stocking measuring 11½ inches in circumference above the knee 9 inches in the calf and 5½ inches in the ankle and a length of 28 inches from top to heel and was dyed light beige at 212° F. It had a light transmission factor as measured by the herein explained method of 26/30, a stretched stitch density averaging 2000 stitches per square inch and a bursting strength of about 38 pounds per square inch. The pressure-support of this garment when measured by the method explained herein and on a medium sized leg was 20 mm. of mercury in the ankle, 19 mm. of mercury in the calf and 17 mm. of mercury in the lower thigh.

EXAMPLE II

Using the same 474 needle 3¾ inch cylinder knitting machine used in Example I, a 60 denier, preshrunk, multifilament yarn with 10 turns of S twist was used for making the turned automatic welt with the stitch cam set to produce a stretched fabric of about 28 inches circumference. Upon completion of the welt, the 60 denier nylon yarn was removed from action and the shadow welt was begun, the feed furnishing 40 denier multifilament nylon with 7 turns Z twist plated over 20 denier multifilament nylon with 7 turns S twist. In the last course of the shadow welt an additional inlay feed was introduced and about 8½ inches limp of 160 core bare rubber yarn pigmented beige with 600% stretch was inlaid in every course. When the last shadow course was complete, its yarns were replaced by the leg body yarn which was a 20 denier multifilament nylon yarn with 30 turns of S twist. At this point, the measured length of bare rubber yarn inlaid in each course was gradually decreased until at a point about 4½ inches below the shadow welt it measured 8 inches per round. Thereafter the amount of bare rubber yarn inlaid in a course remained constant to a point about a foot below the shadow welt. At this point, the stitch cams which previously had been producing stretched fabric measuring 28 inches in circumference began to reduce the stitch size at a constant rate until the ankle was reached about 29¼ inches from the stocking top at which point the stretched circumference was 18 inches. Simultaneously, the inlaid bare rubber yarn in each course was gradually reduced until at the angle about 5¾ inches of bare rubber yarn was laid in a round. Both the knitted fabric and the bare rubber were kept constant from this point until the heel was reached whereupon the bare rubber yarn was withheld and 60 denier nylon mulifilament yarn with 10 turns S or Z twist was substituted for the 20 denier body nylon yarns. The heel was knitted automatically by reciprocation on part of the needles after which the body yarn and bare rubber yarn were again introduced and knitting proceeded to the toe. At this point, the body yarn and the bare rubber yarn were removed from action and the body yarn was replaced by 60 denier multifilament nylon with 10 turns S of Z twist. Afterwards the open toe was closed by looping across the toes under the foot. Alternatively, after the heel has been completed and the bare rubber is again introduced it may be desirable gradually to reduce the tension on the bare rubber yarn to the point where the bare rubber yarns are removed for the toe at which point a round of inlaid bare rubber might measure 7 inches. The stocking above produced was dyed light beige at a temperature ranging from 180–212° F. It had a light transmission factor as measured by the method explained herein of 24/30, a stretched stitch density averaging 1900 stitches per square inch and a bursting strength of 38 pounds per square inch. The pressure-support of this garment when measured by the method explained herein and on a medium sized leg was 11 mm. of mercury in the ankle, 10 mm. in the calf and 9 mm. of mercury in the lower thigh.

EXAMPLE III

A stocking was knitted using the same yarns and procedure as in Example II except that the tension on the bare rubber thread was increased so that in the last course of the shadow welt where the bare rubber is first introduced, the limp circumference was 5½ inches. The limp circumference was gradually decreased to a point about 4½ inches below the welt where it was 5¼ inches. The limp circumference remained constant from this point to a point about a foot below the shadow welt at which point it was gradually decreased to the ankle where it measured 3¼ inches. This stocking had a light transmission factor of 25/30. The pressure-support was 20 mm. of mercury in the ankle, 19 mm. in the calf and 18 mm. in the lower thigh. In other respects it was very similar to the stocking of Example II. If a flared foot section is desired for the stocking of Example III it may be produced by gradually reducing the tension on the bare rubber after the heel is knitted so that the garment, at the point where the toe yarns replace the body yarns, measures 4 inches limp.

It will be noted that the above method which is preferred for knitting on circular machines, utilizes the principle of reducing the size of the knitted stitches and also metering less retractive yarn or increasing the tension on the retractive yarn in the same portion of the fabric. This procedure reduces both the stretched circumference and the limp circumference.

It is possible, of course, to produce a circular knit garment in which the stitch size is held constant and the variation in tension on the retractive yarn does all of the garment shaping. A garment of this type may have all of the desired variations in pressure-support but due to excessive fabric in the narrower portions, such as the ankle of a stocking, the garment may appear more dense in the narrower portions than in the wider portions.

This application is a continuation-in-part consolidation of my application, Serial No. 740,628, filed June 9, 1958, and of my application Serial No. 769,654, filed October 27, 1958, which in turn was a continuation-in-part of my application Serial No. 740,627, filed June 9, 1958, all three of which former applications have now been abandoned.

I claim:

1. A [knitted] garment comprising a shaped, generally tubular, circumferentially stretchable and retractive non-rib knitted body portion *for covering a human body member such as a body joint, leg calf, and the like, said body portion* having a stretched stitch density [in excess of 700] *of at least about 1000* stitches per square inch and having a plurality of different diameters generally corresponding to the contours of [a portion] *the corresponding member* of the human form and formed primarily of fine non-elastomeric yarn, such as nylon, silk or the like, knitted in every stitch of said portion and incorporating substantially throughout said body portion at least one substantially relaxed fine, bare, stretchable, retractive yarn defining the relaxed shape of said body portion and having the major portion thereof extending coursewise of, and locked in, said knitted body *portion* at frequent intervals in every course in which it occurs, said stretchable and retractive yarn being in sufficient courses of the *said* body *portion* so that when [the] *said* body portion is in a stretched condition around [a] *the corresponding* part of the human form of different diameters, it exerts [a definite predetermined] retractive force upon [each portion of] the part.

2. A shaped, generally tubular, circumferentially stretchable and retractive knitted garment comprising a non-rib knitted body portion *for covering a human body member such as a body joint, leg calf and the like, said body portion* having a stretched stitch density [in excess of 700] *of at least about 1000* stitches per square inch and having a plurality of different diameters generally corresponding to the contour of [a portion] *the corresponding member* of the human form and formed primarily of fine non-elastomeric yarn, such as nylon, silk or the like, knitted in every stitch of said portion and incorporating substantially throughout said body portion at least one substantially relaxed fine, bare, stretchable, retractive yarn defining the relaxed shape of said body portion and having the major portion thereof inlaid coursewise of, and locked in, said knitted body *portion* at frequent intervals in every course in which it occurs, said stretchable and retractive yarn being in sufficient courses of the *said* body portion of the garment so that when [the] *said* body portion is in a stretched condition around [a] *the corresponding* part of the human form of different diameters, it exerts [a definite predetermined] retractive force upon [each portion of] the part.

3. The garment of claim 2 wherein the stretchable, retractive yarn is non-elastomeric.

4. The garment of claim 2 wherein the stretchable, retractive yarn is elastomeric and wherein less than about 20% of the stitches of said knitted body portion contain elastomeric yarn in plated or other knitted relationship with the non-elastomeric yarn of the stitches.

5. A shaped, generally tubular, circumferentially stretchable and retractive [knitted] garment comprising a non-rib knitted body portion *for covering a human body member such as a body joint, leg calf and the like, said body portion* having a stretched stitch density [in excess of 700] *of at least about 1000* stitches per square inch and having a plurality of different diameters generally corresponding to the contours of [a portion] *the corresponding member* of the human form and formed primarily of fine non-elastomeric structural yarn knitted in every stitch of said portion and incorporating substantially throughout said body portion at least one substantially relaxed fine, bare elastomeric yarn defining the relaxed shape of said body portion and having a major portion thereof extending coursewise of, and locked in said knitted body *portion* at frequent intervals said stretchable and retractive yarn being in sufficient courses of the *said* body portion of the garment so that when [the] *said* body portion is in a stretched condition around [a] *the corresponding* part of the human form of different diameters, it exerts [a definite predetermined] retractive force upon [each portion of] the part.

[6. The parment of claim 5 having a knitted body portion with a stretched stitch density in excess of 1000 stitches per square inch.]

7. The garment of claim 5 wherein the elastomeric yarn is thermoplastic.

8. The garment of claim 5 wherein the elastomeric yarn is a rubber.

9. The garment of claim 5 wherein the elastomeric yarn is of the polyurethane type.

10. The garment of claim 5 wherein the non-elastomeric structural yarn is nylon yarn.

11. The garment of claim 5 wherein the elastomeric yarn is knitted at frequent intervals in the same stitches with stitches of the non-elastomeric structural yarn of the knitted body portion.

12. The product of claim 5 wherein the garment is a stocking *and said body portion includes at least the ankle and calf of the stocking.*

13. The product of claim 12 wherein the garment is capable of providing therapeutic support.

14. The product of claim 5 wherein the garment is open at both ends.

15. The garment of claim 5 wherein the knitted body portion is seamless.

16. The garment of claim 5 wherein the knitted body portion is seamed longitudinally.

17. The garment of claim 5 wherein the elastomeric yarn is incorporated in every course.

18. A *stocking comprising a* shaped, generally tubular, circumferentially stretchable and retractive [knitted stocking comprising a] non-rib knitted body portion *comprising the ankle and calf of the stocking* having a stretched stitch density [in excess of 700] *of at least about 1000* stitches per square inch and having a plurality of different diameters generally corresponding to the contours of [a portion] *the corresponding parts* of the human form and formed primarily of fine nylon yarn knitted in every stitch of said portion and incorporating substantially throughout said body portion at least one substantially relaxed fine, bare elastomeric yarn defining the relaxed shape of said body portion and having the major portion thereof inlaid coursewise of, and locked in, said knitting body *portion* at frequent intervals in every course in which it occurs, said stretchable and retractive yarn being insufficient courses of the *said* body portion of the garment so that when [the] *said* body portion is in a stretched condition around [a] *the corresponding* part of the human form of different diameters, it exerts [a definite predetermined] retractive force upon [each portion of] the part.

19. A [knitted] garment comprising a shaped, generally tubular, circumferentially stretchable and retractive non-rib knitted body portion *for covering a human body member such as a body joint, leg calf and the like, said body portion* having a stretched stitch density [in excess of 700] *of at least about 1000* stitches per square inch and having a plurality of different diameters generally corresponding to the contours of [a portion] *the corresponding member* of the human form and formed primarily of fine non-elastomeric yarn, such as nylon, silk or the like, knitted in every stitch of said portion and having substantially throughout said body portion at least one substantially relaxed fine, bare, stretchable, retractive yarn defining the relaxed shape of said body portion and separately incorporated therein independent of the knitted structural network of said body portion in the sense that a break in said retractive yarn will not cause a run in the non-elastomeric knitted body portion, said stretchable, retractive yarn having major portions thereof extending coursewise of, and locked in, said knitted body *portion* at frequent intervals in every course in which it occurs, said stretchable and retractive yarn being in sufficient courses of the *said* body portion of the garment so that when [the] *said* body portion is in a stretched condition around [a] *the corresponding* part of the human form of different diameters, it exerts [a definite predetermined] retractive force upon [each portion of] the part.

*20. The product of claim 2 wherein the garment is a stocking and the body portion includes the ankle, calf and knee of the stocking.*

*21. The product of claim 5 wherein the garment is a stocking and the body portion includes the ankle, calf and knee of the stocking.*

*22. The stocking of claim 18 wherein the body portion also comprises the knee of the stocking.*

References Cited in the file of this patent or the original patent

UNITED STATES PATENTS

| | | |
|---|---|---|
| 2,040,965 | Verbeek | May 19, 1936 |
| 2,054,686 | Verbeek | Sept. 15, 1936 |
| 2,161,250 | Getaz | June 6, 1939 |
| 2,161,868 | Kienel et al. | June 13, 1939 |
| 2,230,388 | Schwartz | Feb. 4, 1941 |
| 2,251,805 | Ruedt | Aug. 5, 1941 |
| 2,306,246 | Davis | Dec. 22, 1942 |
| 2,313,446 | Lawson | Mar. 9, 1943 |
| 2,357,506 | Davis | Sept. 5, 1944 |